United States Patent
Lett

(10) Patent No.: US 9,882,736 B2
(45) Date of Patent: Jan. 30, 2018

(54) REMOTE SOUND GENERATION FOR A HOME AUTOMATION SYSTEM

(71) Applicant: Echostar Technologies L.L.C., Englewood, CO (US)

(72) Inventor: David B. Lett, Duluth, GA (US)

(73) Assignee: ECHOSTAR TECHNOLOGIES INTERNATIONAL CORPORATION, Englewood, CO (US)

(*) Notice: Subject to any disclaimer, the term of this patent is extended or adjusted under 35 U.S.C. 154(b) by 0 days.

(21) Appl. No.: 15/189,775

(22) Filed: Jun. 22, 2016

(65) Prior Publication Data
US 2017/0359188 A1    Dec. 14, 2017

Related U.S. Application Data

(60) Provisional application No. 62/347,687, filed on Jun. 9, 2016.

(51) Int. Cl.
*G08B 1/08*  (2006.01)
*H04L 12/28*  (2006.01)
(Continued)

(52) U.S. Cl.
CPC .......... *H04L 12/282* (2013.01); *G06F 3/165* (2013.01); *G08B 3/10* (2013.01); *G08B 13/1672* (2013.01);
(Continued)

(58) Field of Classification Search
CPC .. A61K 2035/124; A61K 35/17; A61K 48/00; C07K 14/7051; C07K 14/70521;
(Continued)

(56) References Cited

U.S. PATENT DOCUMENTS 4,127,966 A    12/1978    Schmidt
4,386,436 A    5/1983    Kocher et al.
(Continued)

FOREIGN PATENT DOCUMENTS

CA    2 267 988 A1    4/1998
CN    105814555 A    7/2016
(Continued)

OTHER PUBLICATIONS

International Preliminary Report on Patentability for PCT/GB2015/052544 dated Mar. 7, 2017, all pages.
(Continued)

*Primary Examiner* — Ojiako Nwugo
(74) *Attorney, Agent, or Firm* — Kilpatrick Townsend & Stockton LLP

(57) ABSTRACT

Various arrangements for sound generation based on remotely-enforced rules are presented. A rule definition for a rule may be received that defines a sound event to be remotely output in response to an occurrence of a home automation event. A home automation host system may monitor home automation data received from one or more home automation devices for the home automation event. In response to receiving home automation data indicative of the home automation event, the rule based on the rule definition may be executed. A sound execution message may be transmitted via a low-power wireless network to a sound generator, the message can include an identifier indicative of the sound.

18 Claims, 7 Drawing Sheets

(51) Int. Cl.
  *G06F 3/16* (2006.01)
  *G08B 13/16* (2006.01)
  *G08B 3/10* (2006.01)
  *H04W 4/00* (2009.01)

(52) U.S. Cl.
  CPC ......... *H04L 12/2827* (2013.01); *H04W 4/005* (2013.01); *H04L 2012/2841* (2013.01)

(58) Field of Classification Search
  CPC ................ C07K 16/2803; C07K 16/30; C07K 2317/622; C07K 2317/73; C07K 2317/76; C07K 2319/03; C07K 2319/33; C07K 2319/74; C12N 5/00
  USPC ............................ 340/500, 539.22, 584, 657
  See application file for complete search history.

(56) References Cited

U.S. PATENT DOCUMENTS

| | | | |
|---|---|---|---|
| 4,581,606 A | 4/1986 | Mallory | |
| 4,694,607 A | 9/1987 | Ishida et al. | |
| 4,728,949 A | 3/1988 | Platte et al. | |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |
| 5,822,012 A | 10/1998 | Jeon et al. | |
| 5,886,638 A | 3/1999 | Tanguay | |
| 5,894,331 A | 4/1999 | Yang | |
| 5,926,090 A | 7/1999 | Taylor et al. | |
| 5,970,030 A | 10/1999 | Dimitri et al. | |
| 6,081,758 A | 6/2000 | Parvulescu | |
| 6,104,334 A | 8/2000 | Allport | |
| 6,107,918 A | 8/2000 | Klein et al. | |
| 6,107,935 A | 8/2000 | Comerford et al. | |
| 6,119,088 A | 9/2000 | Ciluffo | |
| 6,142,913 A | 11/2000 | Ewert | |
| 6,182,094 B1 | 1/2001 | Humpleman et al. | |
| 6,225,938 B1 | 5/2001 | Hayes et al. | |
| 6,286,764 B1 | 9/2001 | Garvey et al. | |
| 6,330,621 B1 | 12/2001 | Bakke et al. | |
| 6,337,899 B1 | 1/2002 | Alcendor et al. | |
| 6,377,858 B1 | 4/2002 | Koeppe | |
| 6,405,284 B1 | 6/2002 | Bridge | |
| 6,415,257 B1 | 7/2002 | Jungua et al. | |
| 6,502,166 B1 | 12/2002 | Cassidy | |
| 6,529,230 B1 | 3/2003 | Chong | |
| 6,543,051 B1 | 4/2003 | Manson et al. | |
| 6,553,375 B1 | 4/2003 | Huang et al. | |
| 6,663,375 B1 | 8/2003 | Huang et al. | |
| 6,646,676 B1 | 11/2003 | DaGraca et al. | |
| 6,662,282 B2 | 12/2003 | Cochran | |
| 6,744,771 B1 | 6/2004 | Barber et al. | |
| 6,748,343 B2 | 6/2004 | Alexander et al. | |
| 6,751,657 B1 | 6/2004 | Zothner | |
| 6,756,998 B1 | 6/2004 | Bilger | |
| 6,876,889 B1 | 4/2005 | Lortz et al. | |
| 6,891,838 B1 | 5/2005 | Petite et al. | |
| 6,931,104 B1 | 8/2005 | Foster et al. | |
| 6,976,187 B2 | 12/2005 | Arnott et al. | |
| 6,989,731 B1 | 1/2006 | Kawai et al. | |
| 7,009,528 B2 | 3/2006 | Griep | |
| 7,010,332 B1 | 3/2006 | Irvin et al. | |
| 7,088,238 B2 | 8/2006 | Karaoguz et al. | |
| 7,103,545 B2 | 9/2006 | Furuta | |
| 7,143,298 B2 | 11/2006 | Wells et al. | |
| 7,234,074 B2 | 6/2007 | Cohn et al. | |
| 7,260,538 B2 | 8/2007 | Calderone et al. | |
| 7,346,917 B2 | 3/2008 | Gatto et al. | |
| 7,372,370 B2 | 5/2008 | Stults et al. | |
| 7,386,666 B1 | 6/2008 | Beauchamp et al. | |
| 7,391,319 B1 | 6/2008 | Walker | |
| 7,395,369 B2 | 7/2008 | Sepez et al. | |
| 7,395,546 B1 | 7/2008 | Asmussen | |
| 7,529,677 B1 | 5/2009 | Wittenberg | |
| 7,574,494 B1 | 8/2009 | Mayernick et al. | |
| 7,579,945 B1 | 8/2009 | Richter et al. | |
| 7,590,703 B2 | 9/2009 | Cashman et al. | |
| 7,640,351 B2 | 12/2009 | Reckamp et al. | |
| 7,659,814 B2 | 2/2010 | Chen et al. | |
| 7,694,005 B2 | 4/2010 | Reckamp et al. | |
| 7,739,718 B1 | 6/2010 | Young et al. | |
| 7,861,034 B2 | 12/2010 | Yamamoto et al. | |
| 7,870,232 B2 | 1/2011 | Reckamp et al. | |
| 7,945,297 B2 | 5/2011 | Philipp | |
| 7,969,318 B2 | 6/2011 | White et al. | |
| 8,013,730 B2 | 9/2011 | Oh et al. | |
| 8,042,048 B2 | 10/2011 | Wilson et al. | |
| 8,086,757 B2 | 12/2011 | Chang | |
| 8,106,768 B2 | 1/2012 | Neumann | |
| 8,156,368 B2 | 4/2012 | Chambliss et al. | |
| 8,171,148 B2 | 4/2012 | Lucas et al. | |
| 8,180,735 B2 | 5/2012 | Ansari et al. | |
| 8,201,261 B2 | 6/2012 | Barfield et al. | |
| 8,221,290 B2 | 7/2012 | Vincent et al. | |
| 8,275,143 B2 | 9/2012 | Johnson | |
| 8,289,157 B2 | 10/2012 | Patenaude et al. | |
| 8,290,545 B2 | 10/2012 | Terlizzi | |
| 8,310,335 B2 | 11/2012 | Sivakkolundhu | |
| 8,316,413 B2 | 11/2012 | Crabtree | |
| 8,320,578 B2 | 11/2012 | Kahn et al. | |
| 8,335,312 B2 | 12/2012 | Gerhardt et al. | |
| 8,350,694 B1 * | 1/2013 | Trundle .................. | G08B 25/08 340/539.11 |
| 8,413,204 B2 | 4/2013 | White et al. | |
| 8,436,902 B2 | 5/2013 | Kuehnle | |
| 8,498,572 B1 | 7/2013 | Schooley et al. | |
| 8,516,087 B2 | 8/2013 | Wilson et al. | |
| 8,539,567 B1 | 9/2013 | Logue et al. | |
| 8,550,368 B2 | 10/2013 | Butler et al. | |
| 8,619,136 B2 | 12/2013 | Howarter et al. | |
| 8,620,841 B1 | 12/2013 | Filson et al. | |
| 8,644,525 B2 | 2/2014 | Bathurst et al. | |
| 8,645,327 B2 | 2/2014 | Falkenburg et al. | |
| 8,667,529 B2 | 3/2014 | Taxier | |
| 8,750,576 B2 | 6/2014 | Huang et al. | |
| 8,780,201 B1 | 7/2014 | Scalisi et al. | |
| 8,781,508 B1 * | 7/2014 | Blakely ................... | G06F 3/1204 455/412.2 |
| 8,786,698 B2 | 7/2014 | Chen et al. | |
| 8,799,413 B2 | 8/2014 | Taylor et al. | |
| 8,818,898 B2 | 8/2014 | Schlossberg et al. | |
| 8,898,709 B2 | 11/2014 | Crabtree | |
| 8,923,823 B1 | 12/2014 | Wilde | |
| 8,930,700 B2 | 1/2015 | Wielopolski | |
| 8,948,793 B1 | 2/2015 | Birkhold et al. | |
| 8,965,170 B1 | 2/2015 | Benea et al. | |
| 9,019,111 B1 | 4/2015 | Sloo et al. | |
| 9,049,567 B2 | 6/2015 | Le Guen et al. | |
| 9,191,804 B1 | 11/2015 | Paczkowski et al. | |
| 9,246,921 B1 | 1/2016 | Vlaminck et al. | |
| 9,258,593 B1 | 2/2016 | Chen et al. | |
| 9,443,142 B2 | 9/2016 | Reynolds, Jr. | |
| 9,462,041 B1 | 10/2016 | Hagins et al. | |
| 9,495,860 B2 | 11/2016 | Lett | |
| 9,511,259 B2 | 12/2016 | Mountain | |
| 9,599,981 B2 | 3/2017 | Crabtree | |
| 9,621,959 B2 | 4/2017 | Mountain | |
| 9,628,286 B1 | 4/2017 | Nguyen et al. | |
| 9,632,746 B2 | 4/2017 | Keipert et al. | |
| 9,729,989 B2 | 8/2017 | Marten | |
| 2001/0012998 A1 | 8/2001 | Jouet et al. | |
| 2002/0003493 A1 | 1/2002 | Durst et al. | |
| 2002/0019725 A1 | 2/2002 | Petite | |
| 2002/0063633 A1 | 5/2002 | Park | |
| 2002/0080238 A1 | 6/2002 | Ohmura | |
| 2002/0193989 A1 | 12/2002 | Geilhufe et al. | |
| 2003/0005431 A1 | 1/2003 | Shinohara | |
| 2003/0052789 A1 | 3/2003 | Colmenarez et al. | |
| 2003/0097452 A1 | 5/2003 | Kim et al. | |
| 2003/0126593 A1 | 7/2003 | Mault | |
| 2003/0133551 A1 | 7/2003 | Kahn | |
| 2003/0140352 A1 | 7/2003 | Kim | |

(56) References Cited

U.S. PATENT DOCUMENTS

| | | |
|---|---|---|
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Lwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jamo |
| 2008/0144884 A1 | 6/2008 | Habibi |
| 2008/0163330 A1 | 7/2008 | Sparrell |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1* | 2/2009 | Jones ................ G08B 25/009 340/584 |
| 2009/0040013 A1* | 2/2009 | Ebrom ................ G06F 9/54 340/3.1 |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0083371 A1 | 4/2010 | Bennetts et al. |
| 2010/0097225 A1 | 4/2010 | Petricoin, Jr. |
| 2010/0102082 A1* | 4/2010 | Ebrom ................ A47L 15/4293 340/3.1 |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1* | 6/2010 | Ebrom ................ G05B 15/02 700/17 |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1* | 11/2011 | Ferringo ................ G04G 13/026 340/384.5 |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0226366 A1* | 9/2012 | Lee ................ H04L 12/281 700/12 |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |

(56) References Cited

U.S. PATENT DOCUMENTS

| | | |
|---|---|---|
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0247117 A1 | 9/2013 | Yamada et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0095684 A1 | 4/2014 | Nonaka et al. |
| 2014/0101465 A1 | 4/2014 | Wang et al. |
| 2014/0135993 A1 | 5/2014 | Kang et al. |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0218517 A1 | 8/2014 | Kim et al. |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0310075 A1 | 10/2014 | Ricci |
| 2014/0313014 A1 | 10/2014 | Huh et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0106866 A1 | 4/2015 | Fujita |
| 2015/0113571 A1 | 4/2015 | Cholas et al. |
| 2015/0116113 A1* | 4/2015 | Caine ............... G04G 13/02 340/539.11 |
| 2015/0127712 A1 | 5/2015 | Fadell et al. |
| 2015/0131500 A1* | 5/2015 | Xie ............... H04W 52/0206 370/311 |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0192914 A1 | 7/2015 | Slupik |
| 2015/0198941 A1 | 7/2015 | Pederson |
| 2015/0241860 A1 | 8/2015 | Raid |
| 2015/0281824 A1 | 10/2015 | Nguyen et al. |
| 2015/0309487 A1 | 10/2015 | Lyman |
| 2015/0325096 A1 | 11/2015 | Hatch |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0191912 A1 | 6/2016 | Lea et al. |
| 2016/0191990 A1 | 6/2016 | McCarthy |
| 2016/0203700 A1 | 7/2016 | Bruhn et al. |
| 2016/0234034 A1 | 8/2016 | Mahar et al. |
| 2016/0256485 A1 | 9/2016 | Wager et al. |
| 2016/0260135 A1 | 9/2016 | Zomet et al. |
| 2016/0285644 A1* | 9/2016 | Lu ............... H04L 12/2823 |
| 2016/0286327 A1 | 9/2016 | Marten |
| 2016/0323548 A1 | 11/2016 | Khot et al. |
| 2016/0334811 A1 | 11/2016 | Marten |
| 2016/0335423 A1 | 11/2016 | Beals |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0065433 A1 | 1/2017 | Gould et al. |
| 2017/0041886 A1 | 2/2017 | Baker et al. |
| 2017/0048476 A1 | 2/2017 | Freiin von Kapri et al. |
| 2017/0054615 A1 | 2/2017 | Wilson |
| 2017/0082987 A1* | 3/2017 | Reddy ............... H04L 67/10 |
| 2017/0127124 A9 | 5/2017 | Wilson et al. |
| 2017/0146964 A1 | 5/2017 | Beals |
| 2017/0168469 A1 | 6/2017 | Marten et al. |
| 2017/0176961 A1* | 6/2017 | Tirpak ............... G05B 15/02 |
| 2017/0187993 A1 | 6/2017 | Martch et al. |
| 2017/0191693 A1 | 7/2017 | Bruhn et al. |
| 2017/0191695 A1 | 7/2017 | Bruhn et al. |
| 2017/0195130 A1 | 7/2017 | Landow et al. |

FOREIGN PATENT DOCUMENTS

| | | |
|---|---|---|
| EP | 2 736 027 A1 | 5/2014 |
| EP | 3 080 677 A1 | 10/2016 |
| EP | 3 080 710 A1 | 10/2016 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2017/116533 A1 | 6/2007 |
| WO | 2011/095567 A1 | 8/2011 |
| WO | 2014/068556 A1 | 5/2014 |
| WO | 2015/179120 A1 | 11/2015 |
| WO | 2016/034880 A1 | 3/2016 |

(56) References Cited

FOREIGN PATENT DOCUMENTS

| WO | 2016/066399 A1 | 5/2016 |
|---|---|---|
| WO | 2016/066442 A1 | 5/2016 |
| WO | 2016/182696 A1 | 11/2016 |

OTHER PUBLICATIONS

International Search Report and Written Opinion for PCT/US2016/057729 dated Mar. 28, 2017, all pages.
European Search Report for EP 16 20 0422 dated Jan. 13, 2017, all pages.
Bdejong_Cree, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of Brazilian Application No. BR 11 2016 0112032 dated Aug. 8, 2017, 2 pages.
Supplementary European Search Report for EP 14868928 dated Jul. 7, 2017, 11 pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Author Unknown, "App for Samsung Smart TV®," Crestron Electronics, Inc., accessed on Jul. 14, 2014, 3 pages. Retrieved from http://www.crestron.com/products/smart tv television apps/.
Author Unknown, "AllJoyn Onboarding Service Frameworks," Qualcomm Connected Experiences, Inc., accessed on Jul. 15, 2014, 9 pages. Retrieved from https://www.alljoyn.org.
"Do you want to know how to find water leaks? Use a Bravedo Water Alert Flow Monitor to find out!", Bravedo.com, accessed Dec. 16, 2014, 10 pages. Retrieved from http://bravedo.com/.
"Flow Pulse®. Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.
"International Building Code Excerpts, Updated with recent code changes that impact electromagnetic locks," Securitron, Assa Abloy, IBC/IFC 2007 Supplement and 2009, "Finally-some relief and clarification", 2 pages.Retrieved from: www.securitron.com/Other/.../New_IBC-IFC_Code_Language.pdf.
"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.
Lamonica, M., "CES 2010 Preview: Green comes in many colors," retrieved from CNET.com (http://ces.cnet.com/8301-31045_1-10420381-269.html), Dec. 22, 2009, 2 pages.

(56) References Cited

OTHER PUBLICATIONS

Robbins, Gordon, Deputy Chief, "Addison Fire Department Access Control Installation." 2006 International Fire Code, Section 1008. 1.3.4, 4 pages.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
International Search Report and Written Opinion for PCT/EP2011/051608 dated May 30, 2011, 13 pages.
International Preliminary Report on Patentability for PCT/EP2011/051608 dated Aug. 16, 2012, 8 pages.
International Search Report and Written Opinion for PCT/US2014/053876 dated Nov. 26, 2014, 8 pages.
International Search Report and Written Opinion for PCT/US2014/055441 dated Dec. 4, 2014, 10 pages.
International Search Report and Written Opinion for PCT/US2014/055476 dated Dec. 30, 2014, 10 pages.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
International Search Report and Written Opinion for PCT/GB2015/052457 dated Nov. 13, 2015, 11 pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
Mexican Institute of Industrial Property Office Action dated Nov. 1, 2013, for Mex. Patent Appln No. MX/a/2012/008882 is not translated into English, 3 pages.
Mexican Institute of Industrial Property Notice of Allowance dated Feb. 10, 2014, for Mex. Patent Appln No. Mx/a/2012/008882, 1 page.
U.S. Appl. No. 14/470,352, filed Aug. 27, 2014 Non Final Office Action dated Nov. 20, 2015, 28 pages.
U.S. Appl. No. 12/700,310, filed Feb. 4, 2010, Office Action dated May 4, 2012, 15 pages.
U.S. Appl. No. 12/700,310, filed Feb. 4, 2010, Final Office Action dated Oct. 10, 2012, 16 pages.
U.S. Appl. No. 12/700,310, filed Feb. 4, 2010 Non-Final Office Action dated Apr. 1, 2013, 16 pages.
U.S. Appl. No. 12/700,310, filed Feb. 4, 2010 Non-Final Office Action dated Oct. 15, 2013, 15 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Aug. 14, 2014, 18 pages.
U.S. Appl. No. 12/700,310, filed Feb. 4, 2010 Non-Final Office Action dated Mar. 11, 2015, 35 pages.
U.S. Appl. No. 12/700,310, filed Feb. 4, 2010 Final Office Action dated Oct. 26, 2015, 19 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012,Non-Final Office Action dated Oct. 2, 2013, 7 pages.
U.S. Appl. No. 13/680,934, filed Nov. 19, 2012,Final Office Action dated Feb. 10, 2014, 13 pages.
U.S. Appl. No. 13/680,934, filed Nov. 19, 2012,Notice of Allowance dated Apr. 30, 2014, 9 pages.
U.S. Appl. No. 13/680,934, filed Nov. 19, 2012, Notice of Allowance dated Jul. 25, 2014, 12 pages.
U.S. Appl. No. 14/107,132, filed Dec. 16, 2013, Non Final Office Action dated May 27, 2015, 26 pages.
U.S. Appl. No. 14/107,132, filed Dec. 16, 2013, Final Rejection dated Dec. 16, 2015, 32 pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12. 2014, Pre-Interview First Office Action dated Oct. 1, 2015, 10 pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
U.S. Appl. No. 14/470,352, filed Aug. 27, 2014 Final Office Action dated Mar. 17, 2016, all pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016. 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
International Preliminary Report on Patentability for PCT/US2014/055476 issued Jun. 14, 2016, 9 pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,246, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.

* cited by examiner

REMOTE SOUND GENERATION FOR A HOME AUTOMATION SYSTEM

CROSS-REFERENCE TO RELATED APPLICATION

This application claims priority to U.S. Provisional Patent Application 62/347,687, filed on Jun. 9, 2016, entitled "Remote Sound Generation for a Home Automation System," the entire disclosure of which is hereby incorporated by reference.

BACKGROUND

Sound generation can play an important role in a home, both when residents are home and away. When residents are away, sound generated within a home can give an impression that people are home (such as people talking) and can help deter break-ins. If a break-in is in progress and sound is generated from within the home, the offender may abort the break-in due to being unsure of whether residents are present. When residents are home, sound can be used to alert residents and visitors to particular conditions, such as a smoke alarm, a garage door being left open, or a television show starting.

SUMMARY

Various systems, devices, methods, and computer-readable mediums for sound generation based on remotely-enforced rules are presented. Such rules are enforced remotely from the device used to produce the sound. For example, a host system can enforce the rules while a remote sound generator outputs the sound. A home automation host system may receive a rule definition for a rule, the rule defining a sound event to be remotely output in response to an occurrence of a home automation event. The home automation host system may monitor home automation data received from one or more home automation devices for the home automation event. In response to receiving home automation data indicative of the home automation event, the home automation host system may execute the rule based on the rule definition. The home automation host system may transmit, to a sound generation device, via a low power wireless network, which, for example, could be an IEEE 802.15-based network (e.g., Zigbee®), or instead could be a Z-Wave® based wireless network, or some other form of low-power mesh or non-mesh network, a sound execution message comprising an identifier indicative of the sound. The sound may correspond to a local audio file stored by the sound generation device. The sound generation device may store a data storage arrangement that links the local audio file with the identifier.

Embodiments of such systems, devices, methods, and computer-readable mediums may include one or more of the following features: The sound generation device may receive, via the low-power wireless network, the sound execution message. The sound generation device may access the data storage arrangement to identify the local audio file based on the received identifier present in the sound execution message. Using an audio transducer of the sound generation device, the accessed local audio file may be output. In response to receiving the rule definition, the home automation host system may transmit an audio file of the sound to the sound generation device as part of a storage message. When the recording of the sound is transmitted to the sound generation device the rule may not yet been executed. The sound generation device may store the audio file of the sound as the local audio file. In response to receiving the recording of the sound, the identifier may be linked with the local audio file in the data storage arrangement. The rule definition of the rule and a sound recording may be received at a mobile device from a user. The mobile device may transmit to the home automation host system via a home automation server system, the rule definition of the rule and the sound recording. The home automation host system may transmit, to the sound generation device, via the low-power wireless network, a local disablement indicator as a parameter of the sound execution message, wherein the local disablement indicator defines whether physical user input provided to the sound generation device is permitted to disable output of the local audio file. The sound generation device may receive the local disablement indicator as part of the sound execution message. The sound generation device may output the sound. In accordance with the local disablement indicator, the sound generator may disable responsiveness to input received via one or more user input components of the sound generation device such that the one or more user input components cannot be actuated by a user to cease output of the local audio file. The low-power wireless network may be a mesh network. Transmitting the sound execution message to the sound generation device from the home automation host system may include relaying, via the low-power wireless network, the sound execution message to the sound generation device via one or more home automation devices. The home automation host system may determine a mobile device is outside a threshold distance of a location linked with the home automation host system. In response to determining the mobile device is outside the threshold distance of the location, the home automation host system may set the home automation host system to a user-away mode. In response to the home automation host system being set to the user-away mode, a set of rules may be enforced that comprise the rule, which is activated when the home automation host system is set to the user-away mode but not active when the home automation host system is set to a user-present mode. The home automation host system may transmit to the sound generation device, a repeat parameter for the sound event, wherein: the repeat parameter is defined by the rule and the repeat parameter defines a number of times or a length of time the local audio file is to be output by the sound generation device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
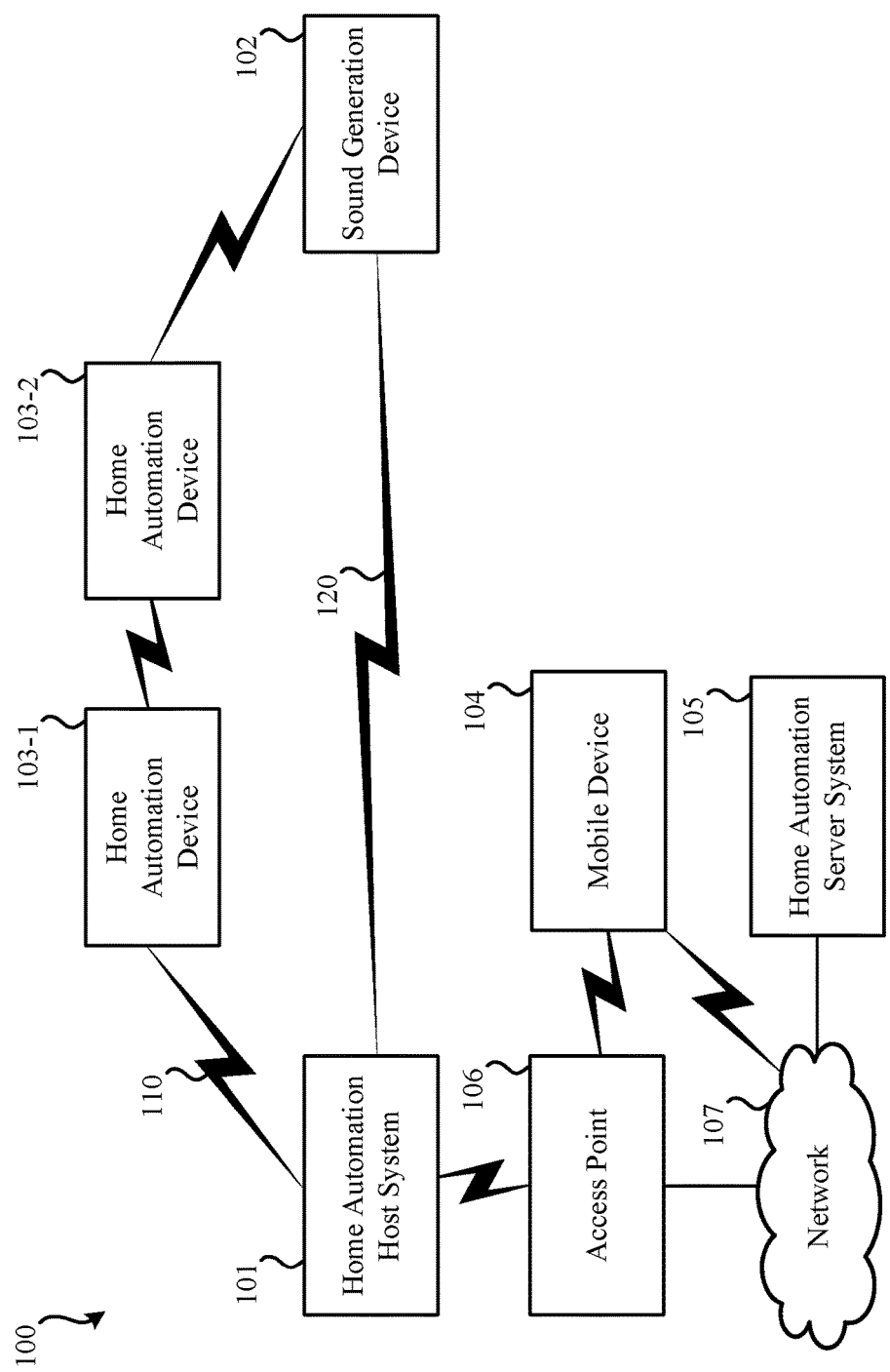
FIG. 1 illustrates an embodiment of a system that uses a low power wireless network to transmit and trigger sound generation.

Incorporated as part of a home automation system may be a sound generation device (also referred to as a sound generator). A sound generator may allow sounds to be output into the home's environment. The sound generator may use a low-power wireless communication protocol to communicate with other home automation devices. For example, in some arrangements, a home automation host system may serve as a hub for user interactions and system communication. This home automation host system may communicate wirelessly with other home automation devices within a household, such as a sound generator. When a sound is desired to be generated, the home automation host system may trigger the sound generator to output the sound. Wireless communication between the home automation host system and the sound generator may occur via a low power wireless network, such as Z-Wave®, ZigBee® (or some other IEEE 802.15.4-based/6LoWPAN communication specification), Bluetooth® or, more generally, some other low power mesh or non-mesh (e.g., direction communication) network communication protocol. A low-power wireless network can be understood as using transmitters that transmit at or below 50 mW. Some embodiments of low-power wireless networks can be defined as using a transmit power of 5 mW or less. Still other low-power wireless networks may use a transmit power of 1 mW (0 dBm), 0.5 mW, or less. The range for such a low-power wireless network may be 20 m or less.

While such a form of wireless communication may be low power, the data rate may be lower than other data transmission protocols. Therefore, if a sound is to be output by the sound generator, it may not be desirable to attempt to transmit the sound to the sound generator as a digital audio file at the time that output is requested; rather the audio file should be pre-stored by the sound generator and then trigger a smaller data transmission at the time of desired output.

Therefore a sound generator may be used to store various sound files that are triggered for output by the home automation host system. The home automation host system may evaluate various locally-stored rules based on received home automation data from various home automation devices. If a rule's one or more conditions are satisfied, the home automation host system may trigger a sound to be output by the sound generator as defined in conjunction with the rule.

By pre-storing sound files at the sound generator, less power can be used due to wireless communication at the time sound output is desired. This arrangement may be especially beneficial when the home automation host system, sound generator, or both are operating on battery power. For example, if a power outage is in effect and a sound is to be generated (e.g., to alert occupants that a door has been left open), little battery power may be used to trigger the sound generator to output the sound as compared to if the sound to be output needed to be transmitted to the sound generator by the home automation host system. As another example, if a house break-in is detected (e.g., a window being opened while the home automation system is set to an away state) and power to the house is cut, a pre-stored sound at the sound generator, such as a dog barking, may be output.

The rules enforced by the home automation host system may alter how the sound generator handles output of a sound. In association with a rule, various sound output parameters may be defined, including: volume, number of repetitions of the sound, and whether a person in the vicinity of the sound generator can provide input to the sound generator to cease sound generation. Referring to this ability of the person near the sound generator to provide input to the sound generator to silence sound output, the desirability of this feature may vary on the type of rule being evaluated. If a break-in is detected (e.g., by a broken window or triggered alarm system being detected), it may be desirable that a person local to the sound generator (e.g., a burglar) cannot silence the sound generator. However, if a garage door being open is detected, a person may wish to cease the sound generator from repeating a sound indicative of the garage door being open.

A sound generator may have some number of default sounds that can be triggered by the home automation host system, such as a telephone ringing, a dog barking, a person yelling (e.g., "I'm calling the police!"), a person walking around, indistinct voices in background, etc. A user may also be able to provide custom sounds via a mobile device, such as a smart phone. A user may record a sound at the mobile device, upload and audio file of the sound (and, possibly, a rule definition) to a home automation server system. The home automation server system may transmit the audio file and rule to the home automation host system. The home automation host system may begin monitoring home automation data to determine when the rule is triggered. Prior to such triggered and in response to the audio file being received, the home automation host system may transmit the audio file for storage to the sound generator. The sound generator may store the audio file in association with an identifier such that on receipt of the identifier from the home automation host system as part of a sound execution message, the sound is locally retrieved and output in accordance with other parameters of the sound execution message (e.g., volume, number of repetitions, whether sound output can be locally disabled, etc.).

While the above provides a synopsis of some of the features of a sound generation system that involves a home automation host system and a sound generator, additional details are provided in relation to the figures. FIG. 1 illustrates an embodiment of a system 100 that uses a low power wireless network to transmit and trigger sound generation. For instance a 6LoWPAN network (IPv6 over a low power wireless personal area network) may use ZigBee®, or Thread for low-power wireless communication. Other low-power communication protocols that are based on IEEE 802.15 radios may also be used. A Z-Wave® based low-power wireless network may be used. Additionally, other forms of wireless local communication may be for communication in other embodiments of system 100.

System 100 may include: home automation host system 101, sound generation device 102, home automation devices 103 (which, by way of example only, includes home automation device 103-1 and home automation device 103-2), mobile device 104, home automation server system 105, access point 106, and network 107. Home automation host system 101 may communicate wirelessly directly with sound generation device 102. For example, if sound generation device 102 and home automation host system 101 are sufficiently close to each other, a low-power wireless network communication link may be used for bidirectional communication. However, in some situations, sound generation device 102 may not be sufficiently close to home automation host system 101 for direct communication using the low-power wireless network communication protocol as illustrated using wireless communication link 120. In such circumstances, a mesh network may be formed using one or more additional devices, such as home automation devices 103. With such a mesh network being used, the low-power wireless network communication protocol may still be used, but data exchanged between home automation host system 10 and sound generation device 102 may be relayed through home automation devices 103 (as illustrated via wireless communication link 110), which are also capable of communicating via the low-power wireless network communication protocol. If power is out at the household at which system 100 is present, the mesh network may be modified based on which low-power wireless network communication-enabled devices are available. For instance, home automation host system 101, home automation device 103-2, and sound generation device 102 may each have a battery-based power module that allows for operation even if power on a household circuit is unavailable. In such a situation, the mesh network may allow sound generation device 102 to communicate with home automation host system 101 via a relay of home automation device 103-2 (without the use of home automation device 103-1).

Figure 6:
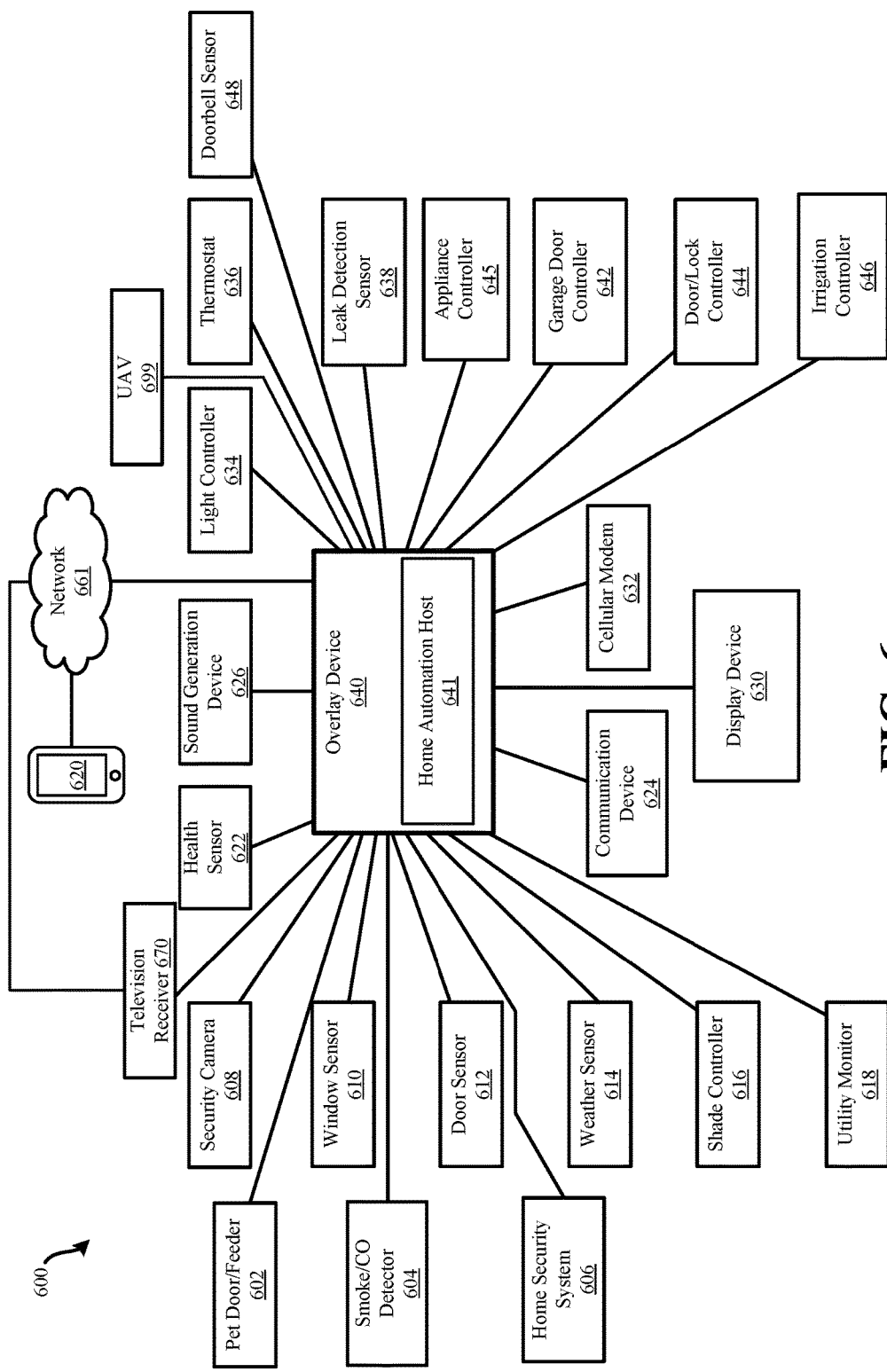
FIG. 6 illustrates an embodiment of a home automation system that can be incorporated as part of the system that uses the low-power wireless network to transmit and trigger sound generation.

Home automation devices 103 may be various other types of home automation devices, such as those detailed in relation to FIG. 6. Alternatively, home automation devices 103 may be dedicated relay devices or some other type of device that uses low-power wireless network communication and can interact with home automation host system 101.

Home automation host system 101 may serve as the hub for the home automation system, may receive user input, may communicate with a remote home automation server system, and may provide users with various audio and/or video based interfaces in which to interact with data received from various home automation devices (e.g., home automation devices 103 and sound generation device 102). Additional detail regarding the functionality of home automation host system 101 is provided in reference to FIG. 2.

Home automation host system 101 may communicate with access point 106. Access point 106 may be a router and/or communication interface that allows for communication with an internet service provider (ISP) and the Internet generally. Home automation host system 101 may communicate using an alternate communication protocol with access point 106. For instance, while a low-power wireless network communication protocol as previously detailed may be used for communication with home automation devices, home automation host system 101 may use a wireless local area network (WLAN) protocol such as WiFi®, which is based on IEEE's 802.11 protocol standard. Generally, a WLAN protocol involves transmission at a transmit power of 10 mW, 50 mW, 100 mW, or greater.

Home automation host system 101 may use access point 106 to communicate with network 107. Network 107 can represent one or more networks including an internet service provider's (ISP) network, a cellular network (e.g., GSM, 2G, 3G, LTE), and the Internet. Through network 107, home automation host system 101 can communicate with home automation server system 105. Home automation server system 105 may maintain accounts and provide services to various different home automation host systems, such as cloud data storage and coordination of communication with remote mobile devices, such as mobile device 104. Mobile device 104 may communication with home automation host system 101 directly through access point 106. In at least situations where mobile device 104 is remote from access point 106, mobile device 104 may communicate with home automation server system 105 via network 107. Home automation server system 105 may then relay communications from mobile device 104 to home automation host system 101 via network 107 and access point 106. Mobile device 104 may execute an application that allows a user to define rules and/or record or select custom sounds to be used by sound generation device 102.

Figure 2:
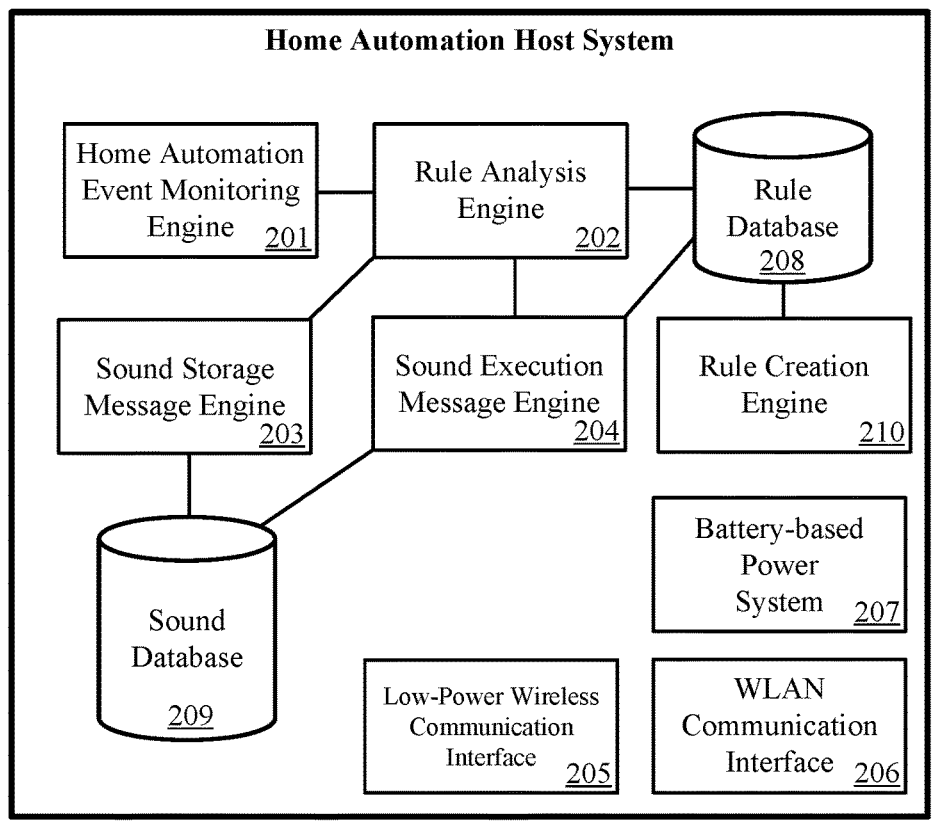
FIG. 2 illustrates an embodiment of a home automation host system.

FIG. 2 illustrates an embodiment of a home automation host system 200. Home automation host system 200 can represent home automation host system 101 of FIG. 1. Home automation host system can include: home automation event monitoring engine 201, rule analysis engine 202, sound storage message engine 203, sound execution message engine 204, low-power wireless communication interface 205, WLAN communication interface 206, battery-based power system 207, rule database 208, sound database 209, and rule creation engine 210. The components illustrated are exemplary components of home automation host system 200; other well-known components have been omitted for simplicity. Computerized components that can be incorporated as part of home automation host system 200 are detailed in relation to computer system 700 of FIG. 7.

Rule creation engine 210 may allow a user to define a rule to be enforced by the home automation host system based on received and analyzed home automation data. Rules created using rule creation engine 210 (or are created remotely, such as via home automation server system 105) that are being enforced by home automation host system 200 result in one or more actions being triggered by home automation host system 200 when all of the conditions of the rule are satisfied. Rule creation engine 210 may allow a user to define one or more conditions that must be present for a rule to be considered satisfied. Table 1 represents an exemplary set of parameters which are set by a user using rule creation engine 210 and define the trigger conditions of a rule:

TABLE 1

| Home Automation State | [User-Away] |
| Home Automation Trigger Device | [Door Sensor] |
| Trigger State | [Door State = Open] |

Table 1 represents trigger conditions of a rule. In this embodiment, three conditions must be satisfied for the rule to be triggered. First, the home automation host system is set to a user-away mode. The home automation state may be set to one of two states: user-away or user-present. Such a setting may be manually defined by a user, such as via an application being executed by mobile device 104 or can be determined by home automation server system 105 or home automation host system 101 based on geo-fencing. In a geo-fencing arrangement, when mobile device 104 is within a defined distance of home automation host system 101 or within a defined distance of a location or area associated with home automation host system 101, the home automation state may be set to "User-Home;" otherwise, the home automation state may be set to "User-Away." In some embodiments of a geo-fencing arrangement, multiple mobile devices are monitored for location. If a family lives at a residence at which home automation host system 101 operates, each of the family members' mobile devices may be monitored for location. If any of the mobile devices are determined to be at the residence at which home automation host system 101 operates, the home automation state may be set to "User-Home."

When a rule is being created using rule creation engine 210, a home automation trigger device can be specified. The home automation trigger device may define the device from which data is to be analyzed and used to determine if the rule is triggered. While Table 1 indicates a door sensor as the exemplary home automation device, various home automation devices may be used, such as any of those specified in relation to FIG. 6 or some other home automation device. Periodically or in response to a state change, such a home automation device may transmit home automation data to the home automation host system.

When a rule is being created using rule creation engine 210, a home automation trigger state can be specified. The trigger states available are associated with the type of trigger device. For example, a door sensor may only have two possible states: door open; and door closed. Other home automation trigger devices may have different and/or a greater number of states. Therefore, based on which trigger device a user has been selected, the available trigger states to select from may be determined.

While Table 1 shows a rule's trigger conditions as being associated with a single trigger device, it may be possible for rule creation engine 210 to create a rule based on home automation data from multiple home automation devices. Table 2 exemplifies such a rule:

TABLE 2

| | |
|---|---|
| Home Automation State | [User-Away] |
| Home Automation Trigger Device #1 | [Door Sensor] |
| Trigger State #1 | [Door State = Open] |
| Home Automation Trigger Device #2 | [Motion Sensor] |
| Trigger State #2 | [Motion = Yes] |

For the trigger conditions of the rule of Table 2, in addition to the door being open, motion is required to be detected by a home automation motion detector while the door is open and the home automation state is away. While Tables 1 and 2 provide various examples of trigger conditions that can be set using rule creation engine 210, it should be understood that the rules trigger conditions that can be defined by a user (or home automation service provider) may vary based on what home automation devices are in communication with home automation host system 200.

Rule creation engine 210 may also allow a user to define rule actions associated with trigger actions. Rule actions refer to the actions to be triggered by rule analysis engine 202 in response to a rule's one or more trigger conditions being satisfied. There can be one or more rule actions incorporated as part of a rule. For example, referring to either Table 1 or Table 2, the rule actions of such rules are presented in Table 3:

TABLE 3

| | |
|---|---|
| Home Automation Action Device | [Sound Generation Device] |
| Home Automation Action | [Output Sound #27] |
| Local Disable Available | [No] |
| Sound Repeat | [10 Times] |
| Sound Volume | [9 of 10] |

The example rule actions of Table 3 are related to the generation of sound in relation to detecting the rules of Table 1 or 2 being triggered. In Table 3, a particular sound is defined. This sound may be stored locally by sound generation device 102 and, possibly, home automation host system 200. The rule actions may also define whether the sound can be locally disabled by a user at the sound generation device by providing user input directly to the sound generation device (e.g., by pushing a button or actuating some other user input device of the sound generation device). If disabled, user input provided directly to the sound generation device may not affect the output of the sound. "Sound Repeat" may define a length of time or number of times the audio file is output by the sound generation device. For example, this parameter may define that the sound is output once or up to an unlimited number of times until disabled either at the sound generation device (if permitted), via the home automation host system, or a mobile device. "Sound volume" may define the volume at which the sound is output by the sound generator.

While Table 3 exemplifies a single action in response to the rule's one or more trigger conditions being satisfied, it should be understood that multiple actions may be triggered by the home automation host system 200 in response to a rule's one or more triggers being satisfied. For instance, home automation host system 200 may begin recording a video feed from a home automation security camera. Other fields may be possible in conjunction with the trigger conditions of Tables 1 and 2 and the rule actions of Table 3. For instance, as part of the trigger conditions, a user may specify the rule only applies during a particular time period (e.g., at night), day of the week (e.g., weekdays, weekends), time of the year and whether the home automation host system and/or sound generator is operating on battery power (e.g., due to the power being out). Further, it should be understood that the trigger conditions and rule actions of Tables 1-3 are merely exemplary: such home automation rules may be customized as desired by a user of the home automation host system to accommodate many various conditions.

Once a rule has been created locally by rule creation engine 210 or is created remotely using mobile device 104 and/or home automation server system 105, the rule may be stored in rule database 208. Rule database 208 may store various home automation rules that are to be enforced by home automation host system 200. Home automation event monitoring engine 201 may receive home automation data from some or all of the home automation devices (e.g., home automation devices 103) that communicate with home automation host system 200. Such home automation data may indicate state changes, current state, and/or a data feed from such home automation devices. For example, devices such as a door sensor may transmit a state change to home automation host system 200 when the door transitions from opened to closed or closed to open. Another type of home automation device, such as a security camera, may stream a video stream to home automation host system 200, which is then processed by home automation host system 200. Home automation data may be processed by home automation event monitoring engine 201 and data relevant to rules may be passed to rule analysis engine 202. For example, rather than a raw video feed being passed by home automation event monitoring engine 201 to rule analysis engine 202, only an indication of whether motion was detected in a particular region of the field-of-view of the home automation security camera may be passed to rule analysis engine 202. Rule analysis engine 202 may analyze whether rules from rule database 208 have their trigger conditions satisfied. If so, rule analysis engine 202 may cause the rule action(s) of the triggered rule to be performed. As illustrated, home automation host system 200 has rule analysis engine 202 in communication with sound execution message engine 204. It should be understood that rule analysis engine 202 may be in communication with many engines that structure messages intended for a particular home automation device. The illustrated embodiment of home automation host system 200 is focused on instructions related to sound generation via sound generation device 102 of FIG. 1.

When a rule has been satisfied as determined by rule analysis engine 202, rule analysis engine 202 may instruct sound execution message engine 204 to compose and send a sound execution message to a sound generator based on the one or more rule actions associated with the triggered rule from rule database 208. Sound execution message engine 204 may retrieve rule action data from rule database 208 to determine how the sound execution message should be structured, such as to include parameters as exemplified in Table 3. Once sound execution message engine 204 has composed the sound execution message, the sound execution message may be transmitted to the sound generation device (e.g., sound generation device 102) via low-power wireless network communication interface 205. Of note, the sound execution message may not contain an audio file of the sound to be generated. Rather, based on a relationship specified in sound database 209, the sound execution message may include a reference to or identifier of the sound file to be output. This sound file is already stored by the sound generation device. In response to the sound execution message, the sound generator outputs the sound into the ambient environment in accordance with the parameters of the sound execution message.

As previously indicated, the sound generator can have a number of default or pre-stored sounds that may come pre-installed on the sound generator at the time of purchase by a user. The user can also add custom sounds, such as sound files recorded by the user or otherwise acquired by the user (e.g., downloaded from a website). In order to output such sounds, the sound files associated with such custom sounds may be sent to the sound generation device in combination with a sound storage message. A sound storage message may not cause the sound to be output, but rather for the sound to be stored by the sound generation device in association with a reference or identifier. Therefore, when a future sound execution message containing the reference or identifier is received by the sound generator, the audio file of the sound can be locally identified and accessed by the sound generator.

Sound storage message engine 203, in response to home automation host system 200 receiving a new custom sound, may cause the custom sound to be stored, at least temporarily, in sound database 209. A reference or identifier may be assigned to the sound and stored in conjunction with the sound in sound database 209. The audio file of the sound may then be transmitted to the sound generator in association with a sound storage message generated by sound storage message engine 203. This sound storage message may indicate the reference to be used for the audio file and may contain the audio file. In some embodiments, the reference or identifier is selected by the sound generator and an indication of such is sent by the sound generator to home automation host system 200 for storage in association with the sound in sound database 209.

Home automation host system 200 may primarily be powered via an AC-to-DC converter that receives AC power from an outlet. However, when AC power is out, it may be desirable for the home automation system to continue functioning (e.g., to provide security functionality). Battery-based power system 207 may provide back-up power and allow home automation host system 200 to continue to operate and communicate with home automation devices via low-power wireless network communication interface 205. WLAN communication interface 206 may be powered, but communication may be unavailable unless an access point (e.g., router) with which WLAN communication interface 206 communicates also has a back-up power supply.

Low-power wireless network communication interface 205 may allow for low-powered communication with home automation devices as previous detailed using a mesh network and/or direct to device communication. Low-power wireless network communication interface 205 may allow for communication using multiple low-power wireless network communication protocols, including Zigbee®, Z-Wave®, and/or Thread. WLAN communication interface 206 may be used primarily for communication with mobile device 104 and/or home automation server system 105 using WiFi® or some other wireless local area network communication protocol.

Figure 3:
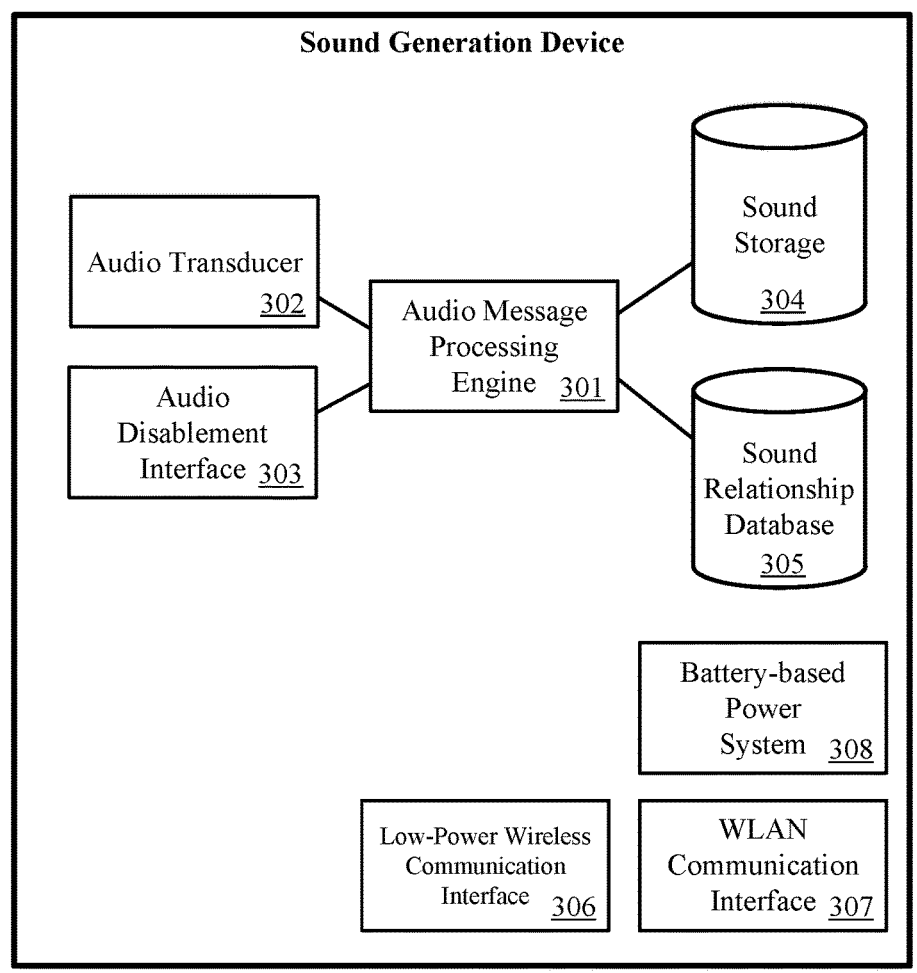
FIG. 3 illustrates an embodiment of a home automation sound generation device.

FIG. 3 illustrates an embodiment of a sound generation device 300 (also referred to as a sound generator) that can function as part of a home automation system. Sound generation device 300 can represent sound generation device 102 of FIG. 1. Sound generation device 300 may include: audio message processing engine 301, audio transducer 302, audio disablement interface 303, sound storage 304, sound relationship database 305, low-power wireless network communication interface 306, WLAN communication interface 307, and battery-based power system 308.

Audio message processing engine 301 may receive messages pertaining to sound generation via low-power wireless network communication interface 306. Audio message processing engine 301 may analyze received messages to determine if such a message is a sound execution message or sound storage message. For a sound execution message, audio message processing engine 301 may analyze parameters of the sound execution message to determine which sound should be output, at what volume the sound should be output, how many times, if any, output of the sound should be repeated, and whether it should be possible for output of the sound to be disabled via audio disablement interface 303. Audio message processing engine 301 may analyze the received reference or identifier present within a sound execution message and determine a relationship between the reference or identifier and a stored sound file via sound relationship database 305. Sound relationship database 305 may relate identifiers or references to particular locally stored audio files. Such audio files may be stored in sound storage 304. Audio message processing engine 301 may cause audio transducer 302 output sound based on the audio file in accordance with the parameters of the sound execution message.

Audio transducer 302 may include one or more components that are configured to generate sound based on received electrical signal. Audio transducer 302 may include one or more speakers and/or one or more buzzers or sirens. Depending on the type of sound to be output as determined by audio message processing engine 301, a different audio transducer component may be used to output sound. Such as, for an alarm, a siren or buzzer may be used, while for a recorded spoken message, one or more speakers may be used.

Audio disablement interface 303 may include one or more buttons or other components present on sound generation device 300 which a user can press or otherwise actuate to disable output of the sound. Audio disablement interface 303 may only be enabled for use based on a corresponding parameter present in a sound execution message. That is, if a sound being output by audio transducer 302 based on a sound execution message that specifies that audio disablement interface 303 is to be disabled, user input provided to audio disablement interface 303 while the sound is being generated may be ignored and thus may be ineffective in ceasing output of the sound by audio transducer 302. If the sound being output by audio transducer 302 based on a sound execution message that specifies that audio disablement interface 303 is enabled, user input provided to audio disablement interface 303 while the sound is being generated may be processed and uses a trigger to disable output of the sound by audio transducer 302.

Low-power wireless network communication interface 306 may allow for low-powered communication with home automation devices and the home automation host system as previously detailed using a mesh network and/or direct to device communication. Low-power wireless network communication interface 306 may allow for communication using multiple low-power wireless network communication protocols, including Zigbee®, Z-Wave®, and/or Thread. In some embodiments, a WLAN communication interface 307 may be present. Such a communication interface may be used for initially receiving and storing custom sound filed. WLAN communication interface 307 may use WiFi® or some other wireless local area network communication protocol.

Audio message processing engine 301 may also receive and process a sound storage message. In response to a sound storage message, audio message processing engine 301 may store a received audio file in sound storage 304. Audio message processing engine 301 may also store an indication of the audio file in relation with an identifier or reference in sound relationship database 305. The identifier or reference may be selected by the home automation host system from which the sound storage message was received. In other embodiments, audio message processing engine 301 may select or create the identifier or reference to be used in sound relationship database 305 and may transmit an indication of such an identifier or reference to the home automation host system. Regardless of whether the reference is chosen by the home automation host system or the sound generation device, when a sound execution message is received that contains the reference by sound generation device 300, the reference may be used in conjunction with the sound relationship database 305 to identify an audio file stored as part of sound storage 304. The appropriate audio file may then be retrieved from sound storage 304 and output via audio transducer 302 in accordance with the parameters of the sound execution message. In some embodiments, sound storage messages and the associated audio files are received via WLAN communication interface 307 and sound execution messages are received via low-power wireless network communication interface 306. As such, since only low-power wireless network communication interface 306 may be available when household AC power is unavailable, it may be possible to trigger and output sound, but not receive and store a custom sound via WLAN communication interface 307. In other embodiments, both storage and execution messages are received via low-power wireless network communication interface 306.

Battery-based power system 308 may provide back-up power and allow sound generation device 300 to continue to operate and communicate with other home automation devices and the home automation host system via low-power wireless network communication interface 306. WLAN communication interface 307 may be powered, but communication may be unavailable unless an access point (e.g., router) with which WLAN communication interface 307 communicates also has a back-up power supply.

In addition to receiving sound files to store and sound execution messages, sound generator 300 may receive firmware updates, such as to help ensure compatibility with future standards and allow new capabilities to be introduced to sound generator 300 after being deployed as part of a home automation system. A home automation host system may be configured to periodically check for firmware updates for sound generator 300 and provide such an update to sound generator 300 when available. Additionally, alternatively, or as part of the firmware update, service provider selected audio files may be transmitted to and loaded onto sound generator 300. This arrangement may be desirable if a service provider desires a particular sound to be available to all users (e.g., a sound that has been found to be effective at deterring break-ins or alerting users to a particular condition). Therefore, at least three possible ways of an audio file being loaded onto sound generator 300 are possible: (1) audio files being loaded onto the sound generator at manufacture or prior to shipping to a user; (2) a user uploading a customized audio file; and (3) predefined audio files being transmitted to the sound generator by the service provider after the sound generator has been installed as part of a home automation system and is in communication with a home automation host system.

Figure 4:
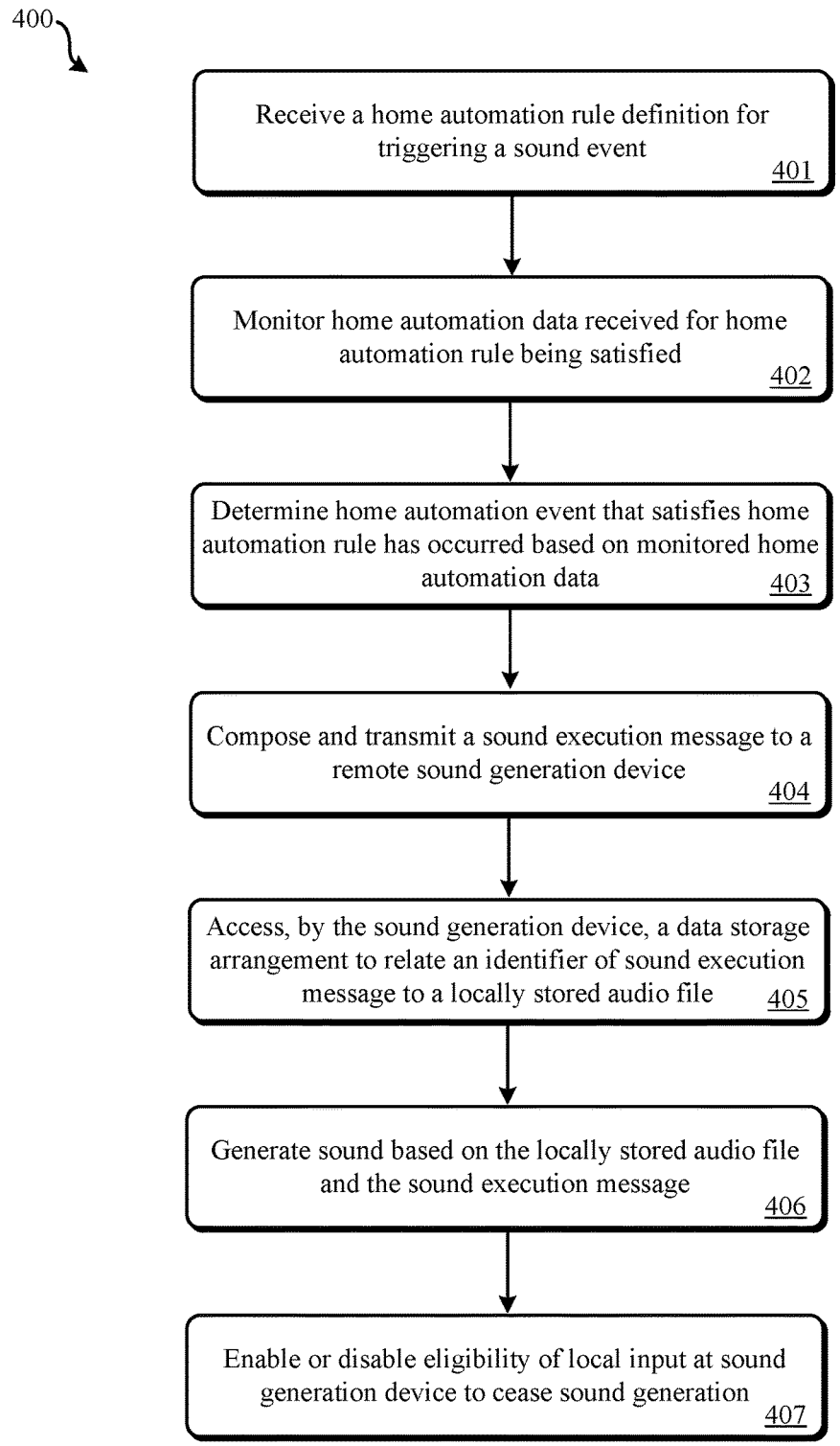
FIG. 4 illustrates an embodiment of a method for triggering output of a sound by the home automation generation device.

Various methods may be performed in accordance with the systems of FIGS. 1-3. For example, FIG. 4 illustrates an embodiment of a method 400 for triggering output of a sound by the home automation generation device. Method 400 may be performed using system 100, home automation host system 200, and sound generation device 300.

At block 401, a home automation rule definition may be received by the home automation host system. The rule definition may define various conditions that trigger execution of the role and may define various actions to be taking by the home automation host system in response to the rule being triggered. The home automation rule may be defined directly at the home automation host system via an interface presented to a user (e.g., via a connected display device such as a television), or via a remote device, such as a mobile device may communicate with the home automation host system via a network and, possibly, a home automation server system.

At block 402, the home automation host system may monitor received home automation data to determine if the home automation rule of block 401 has been satisfied. When all of the trigger conditions of the home automation rule have been satisfied based on the monitored home automation data of block 402, block 403 may be executed.

At block 403, the home automation host system may determine that the trigger conditions of the home automation event have been satisfied based on the monitored home automation data. As such, based on block 403, the rule actions that were defined at block 401 may be executed by the home automation host system. In the illustrated embodiment of method 400, the actions to be taken in response to the triggering conditions of the role being satisfied include a sound being remotely output from the home automation host system via a sound generation device. As such, at block 404, a sound execution message may be composed and transmitted to a remote sound generation device. The sound execution message composed and transmitted at block 404 may include a reference to a particular sound that is to be output by the sound generation device. This reference may identify a particular locally stored audio file of the sound generation device. Therefore, when the sound is to be output by the sound generation device, and audio file of the sound does not need to be transmitted to the second-generation device because it is already locally stored by the sound generation device. In addition to the identifier, the sound execution message may include one or more parameters that were defined as part of the rule at block 401 for how the sound should be output. These parameters may include: a volume, whether the sound should be repeated in a number of times of the sound should be repeated, and an indication of whether user input provided locally at the sound generation device is permitted to disable output of the sound. The transmitted sound execution method of block 404 may be transmitted using a low-power wireless network communication protocol.

At block 405, the sound generation device may access a data storage arrangement to identify a locally stored audio file associated with the reference or identifier received as part of the sound execution message. Sound may then be generated at block 406 by the sound generation device based on the locally retrieved audio file and the parameters included in the sound execution message, such as those that define a volume and whether the sound should be repeated.

At block 407, the eligibility of a user input component of sound generator device may be enabled or disabled based on parameters of the sound execution message. While the user may still be able to push or otherwise actuate a button or other form of user input device present on the sound generation device, whether such input causes the sound generation device to cease outputting the sound can be based on a corresponding parameter of the sound execution message. This parameter may have been defined when a user created the home automation rule at block 401.

In some embodiments, in response to sound being output via the sound generator at block 406, the home automation host system, possibly in conjunction with the home automation server system, may cause a push notification to be transmitted to a mobile device associated with the rule or, more generally, the home automation host system. This push notification may notify the user that the trigger conditions of the rule have been satisfied and, possibly, that sound is being output by the sound generator. In some embodiments, a push notification may also be provided to indicate if someone has attempted to disable output of the sound by providing user input directly to the sound generation device (e.g., by actuating a user input component or unplugging the sound generation device, which may be sensed by a transition from AC to battery-based power). The content of the message pushed to the mobile device may be dependent on whether local input is eligible to disable sound. For instance, the push notification may state: "Sound stopped being output at the sound generator because a user provided input" or "A person tried to disable sound at the sound generator, but this functionality is disabled so the sound is still being output." Such a response may be particularly useful if the user of the mobile device knows that no one is supposed to be on the premises of the home automation host system. The user of the mobile device may have the ability to remotely disable sound generation by providing input to an application being executed by the mobile device. This command may be passed to a home automation server system which may, in turn, pass the commands to the home automation host system. The home automation host system may then transmit a command to the sound generation device to cease sound generation.

Figure 5:
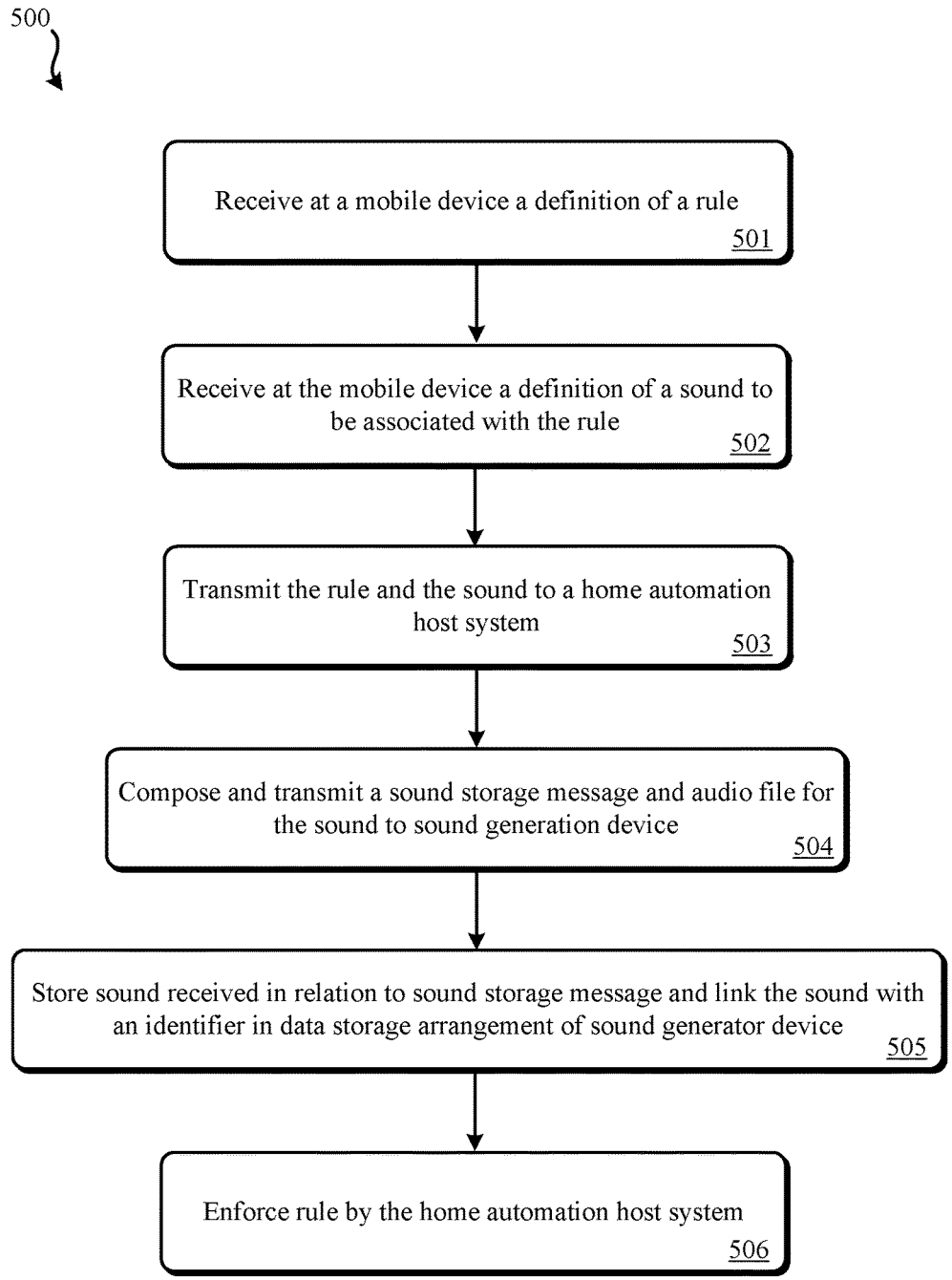
FIG. 5 illustrates an embodiment of a method for establishing a customized sound at the home automation generation device.

FIG. 5 illustrates an embodiment of a method for establishing a customized sound at the home automation generation device. Method 500 may be performed using system 100, home automation host system 200, and sound generation device 300. Method 500 may be performed in conjunction with method 400. For example, while method 400 details the definition and enforcement of a rule, method 500 may be performed first in order to provide the sound to be output in response to the trigger conditions of such a rule being satisfied.

At block 501, a definition of a rule may be received at a mobile device. The mobile device, which may be a smart phone, tablet computer, or other mobile and/or wireless device, may execute an application that allows a user to select parameters that indicate the one or more trigger conditions of a rule and the one or more rule actions of the rule. The user may be presented with a listing of various home automation devices that are in communication with the home automation host system. At least some of the trigger conditions may be based on data received from such home automation devices. The user may also be able to select among various actions to be performed using home automation devices, including a sound generation device. At block 501, the user may indicate that a response to the rule includes the generation of a sound using the sound generation device of the home automation system.

At block 502, the user may select a definition of a sound to be output when the trigger conditions of the rule are satisfied. The sound selected by the user may be a predefined sound that is already stored by the sound generation device, the home automation host system, and/or the home automation server system. The sound may also be a custom sound that is recorded by the user via the mobile device or is downloaded by the mobile device, such as from a third-party website. At block 503, the rule and the sound (if a custom sound that is not already available at the home automation host system, home automation server system, and/or sound generation device) may be transmitted to the home automation host system. This transmission to the home automation host system may be performed via the home automation server system. Therefore, the mobile device may communicate with the home automation server system, which, in turn, may reformat and relay information to the home automation host system associated with the user and mobile device from which the rule and the sound were received at block 503.

At block 504, the home automation host system may store the rule and sound. Receipt of a custom sound can trigger the home automation host system to send a sound storage message to the sound generation device. This sound storage message may include the sound and parameters associated with the sound, such as a reference or identifier to be associated with the sound. The sound storage message may be sent via a low-power wireless network or WLAN network connection between the home automation host system and the sound generation device. In some embodiments, rather than an identifier being sent to the sound generation device, the sound generation device may assign the reference or identifier and transmit the reference or identifier in response to the home automation host system. At block 505, the sound generation device, whether it selects the identifier or the identifier is assigned by the home automation host system, stores the custom sound in relation to the identifier using a data storage arrangement, such as flash memory. The sound storage message causes the sound generation device to store the custom sound, but not to output the sound.

At block 506, the home automation host system may enforce the rule. When the rule is triggered based on the rule's one or more trigger conditions being satisfied, the home automation host system may send, via a low-power wireless network communication link, a sound execution message to the sound generation device that includes the reference to the custom sound (but not the audio file of the sound) along with one or more parameters that define how the sound should be output, such as: volume, number of repeats, and whether generation of the sound can be locally disabled at the sound generation device. In some embodiments, the home automation host system may transmit a message to the home automation server system indicating the sound generation device has been triggered to output a sound. An indication of the rule triggered may be provided to the home automation server system. The home automation server system may transmit an indication of the rule trigged and/or that the sound is being output to the mobile device associated with the home automation host system. A user, via the mobile device, may be given an opportunity to cease output of the sound from the sound generation device. If a person attempts to locally disable output of the sound at the sound generation device, an indication of such may be passed by the sound generation device to the home automation host system, then to the home automation server system, and then possibly to the mobile device.

FIG. 6 illustrates an embodiment of a home automation system 600 that can communicate with a home automation host system and which can function as a low-power wireless network mesh network. FIG. 6 illustrates an embodiment of a home automation system 600 hosted by an overlay device 640. As such, in home automation system 600, overlay device 640 functions as the home automation host system. Overlay device 640 refers to a device that can be connected with a separate display device 630, such that information regarding the home automation system is presented by display device 630. In some embodiments, overlay device 640 receives data from a separate device, such as television receiver 670, and overlays home automation data and user interfaces over television (e.g., television programming) signals output by television receiver 670. Television receiver 670 may be configured to receive television programming from a satellite-based television service provider; in other embodiments other forms of television service provider networks may be used, such as an IP-based network (e.g., fiber network), a cable based network, a wireless broadcast-based network, etc.

In some embodiments, overlay device 640 may be coupled between television receiver 670, which may be in the form of a set top box, and display device 630, which may be a television. In such embodiments, television receiver 670 may receive, decode, descramble, decrypt, store, and/or output television programming. Television receiver 670 may output a signal, such as in the form of an HDMI signal. Rather than be directly input to display device 630, the output of television receiver 670 may be input to overlay device 640. Overlay device 640 may receive the video and/or audio output from television receiver 670. Overlay device 640 may add additional information to the video and/or audio signal received from television receiver 670. The modified video and/or audio signal may be output to display device 630 for presentation. In some embodiments, overlay device 640 has an HDMI input and an HDMI output, with the HDMI output being connected to display device 630.

In the illustrated embodiment of FIG. 6, overlay device 640 serves as a home automation host system. In other embodiments, it should be understood that television receiver 670 may serve as the home automation host system. Therefore, in other embodiments, functionality attributed to overlay device 640 may instead be fully or partially implemented by television receiver 670. In still other embodiments, a different device, such as a dedicated computerized device, or another device illustrated as part of home automation system 600, can serve as the home automation host system.

Overlay device 640 may be configured to communicate with multiple home automation devices. The devices with which overlay device 640 communicates may use different communication standards, including both wireless and wired communication standards. For instance, one or more devices may use a low-power wireless network communication protocol, such as ZigBee® while one or more other devices communicate using Z-Wave®. Other forms of local wireless communication may be used by devices and overlay device 640. For instance, overlay device 640 and one or more devices may be configured to communicate using a wireless local area network, which may use a communication protocol such as IEEE 802.11.

Using overlay device 640 to present automation information via display device 630 may have additional benefits. For instance, multiple devices may provide input video to overlay device 640. For instance, television receiver 670 may provide television programming to overlay device 640, a DVD/BLU-RAY player may provide overlay device 640, and a separate internet-TV device may stream other programming to overlay device 640. Regardless of the source of the video/audio, overlay device 640 may output video and/or audio that has been modified to include home automation information and output to display device 630. As such, in such embodiments, regardless of the source of video/audio, overlay device 640 may modify the audio/video to include home automation information and, possibly, solicit for user input. For instance, in some embodiments, overlay device 640 may have four video inputs (e.g., four HDMI inputs) and a single video output (e.g., an HDMI output). In other embodiments, such overlay functionality may be part of television receiver 670. As such, a separate device, such as a Blu-ray player, may be connected with a video input of television receiver 670, thus allowing television receiver 670 to overlay home automation information when content from the Blu-Ray player is being output to display device 630.

Regardless of whether television receiver 670 is itself configured to provide home automation functionality and output home automation input for display via display device 630 or such home automation functionality is provided via overlay device 640, home automation information may be presented by display device 630 while television programming is also being presented by display device 630. For instance, home automation information may be overlaid or may replace a portion of television programming (e.g., broadcast content, stored content, on-demand content, etc.) presented via display device 630.

In some embodiments, a separate device may be connected with overlay device 640 to enable communication with home automation devices. For instance, communication device 624 may be in communication with overlay device 640. Communication device 624 may be in the form of a dongle. Communication device 624 may be configured to allow for Zigbee®, Z-Wave®, and/or other forms of (low-power) wireless or wired communication. The communication device may connect with overlay device 640 via a USB port or via some other type of (wired) communication port. Communication device 624 may be powered by the overlay device (or television receiver, if the television receiver is serving as the home automation host system) or may be separately coupled with a power source. In some embodiments, overlay device 640 may be enabled to communicate with a local wireless network and may use communication device 624 in order to communicate with devices that use a ZigBee® communication protocol, Z-Wave® communication protocol, and/or some other home wireless communication protocols.

Communication device 624 may also serve to allow additional components to be connected with overlay device 640 or television receiver 670. For instance, communication device 624 may include additional audio/video inputs (e.g., HDMI), a component, and/or a composite input to allow for additional devices (e.g., Blu-ray players) to be connected with television receiver 670 and/or overlay device 640. Such connection may allow video from such additional devices to be overlaid with home automation information. Whether home automation information is overlaid onto video may be triggered based on a user's press of a remote control button.

Regardless of whether overlay device 640 uses communication device 624 to communicate with home automation devices, overlay device 640 may be configured to output home automation information for presentation to a user via display device 630, which may be a television, monitor, or other form of device capable of presenting visual information. Such information may be presented simultaneously with television programming received by television receiver 670. Television receiver 670 may also, at a given time, output television programming that may be augmented or replaced by home automation information by overlay device 640. The user may be able to provide input to television receiver 670 and/or overlay device 640 to control the home automation system hosted by either television receiver 670 or by overlay device 640, as detailed below.

Television receiver 670 or overlay device 640 may be configured to communicate with one or more wireless devices, such as (wireless) mobile device 620. Mobile device 620 may represent a tablet computer, cellular phone (e.g., smartphone), laptop computer, remote computer, or some other device through which a user may desire to control home automation settings and view home automation information. Such a mobile device also need not be wireless, such as a desktop computer. Television receiver 670, communication device 624, or overlay device 640 may communicate directly with mobile device 620, or may use a local wireless network, such as network 661. Mobile device 620 may be remotely located and not connected with a same local wireless network. Via the Internet, television receiver 670 or overlay device 640 may be configured to transmit a notification and/or other information to mobile device 620 regarding home automation information. For instance, in some embodiments, a third-party notification server system, such as the notification server system operated by Apple®, may be used to send push notifications to mobile device 620.

In some embodiments, a location of mobile device 620 may be monitored. For instance, if mobile device 620 is a cellular phone, when its position indicates it is located near a door, the door may be unlocked. A user may be able to define which home automation functions are controlled based on a position of mobile device 620. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 670.

In some embodiments, little to no setup of network 661 may be necessary to permit television receiver 670 to stream data out to the Internet. For instance, television receiver 670 and network 661 may be configured, via a service such as SLING or other video streaming service, to allow for video to be streamed from television receiver 670 to devices accessible via the Internet. Such streaming capabilities may be "piggybacked" to allow for home automation data to be streamed to devices accessible via the Internet. For example, U.S. Patent Application Ser. No. 62/645,870, filed on Dec. 23, 2009, entitled "Systems and Methods for Remotely Controlling a Media Server via a Network," which is hereby incorporated by reference, describes one such system for allowing remote access and control of a local device. U.S. Pat. No. 8,171,148, filed Apr. 67, 2009, entitled "Systems and Methods for Establishing Connections Between Devices Communicating Over a Network," which is hereby incorporated by reference, describes a system for establishing connection between devices over a network. U.S. Patent Application Ser. No. 62/619,192, filed May 69, 2011, entitled "Systems and Methods for Delivering Messages Over a Network," which is hereby incorporated by reference, describes a message server that provides messages to clients located behind a firewall.

Mobile device 620 may serve as an input device for television receiver 670 and/or overlay device 640. For instance, mobile device 620 may be a tablet computer that allows text to be typed by a user and provided to television receiver 670. Such an arrangement may be useful for text messaging, group chat sessions, or any other form of text-based communication. Other types of input may be received for the television receiver from a tablet computer or other device as shown in the attached screenshots, such as lighting commands, security alarm settings and door lock commands. While mobile device 620 may be used as the input device for typing text, television receiver 670 may output for display text to display device 630. As another example, if a user needs to provide waypoints (such as GPS coordinates) to a home automation system, mobile device 620 may be brought to the physical location associated with a waypoint to log the associated coordinates.

In some embodiments, a cellular modem 632 may be connected with either overlay device 640 or television receiver 670. Cellular modem 632 may be useful if a local wireless network is not available. For instance, cellular modem 632 may permit access to the Internet and/or communication with a television service provider. Communication with a television service provider may also occur via a local wireless or wired network connected with the Internet. In some embodiments, information for home automation purposes may be transmitted by a television service provider system to television receiver 670 or overlay device 640 via the television service provider's distribution network, which may include the use of satellites.

Various home automation devices may be in communication with television receiver 670 or overlay device 640. Some or all of such home automation devices may function as part of a low-power wireless network mesh network to allow for communication between home automation host 641 (which can refer to home automation host system 101)

and such devices. Such home automation devices may use disparate communication protocols. Such home automation devices may communicate with television receiver 670 directly or via communication device 624. Such home automation devices may be controlled by a user and/or have a status viewed by a user via display device 630 and/or mobile device 620. Home automation devices may include: smoke/carbon monoxide (CO) detector 604, home security system 606, pet door/feeder 602, security camera 608, window sensor 610, irrigation controller 646, weather sensor 614, shade controller 616, utility monitor 618, heath sensor 622, sound generation device 626 (which can refer to the sound generation devices of FIGS. 1-5), light controller 634, thermostat 636, leak detection sensor 638, overlay device 640, appliance controller 645, garage door controller 642, and doorbell sensor 648.

Leak detection sensor 638 may detect the presence of water or the flow of water through a pipe. The presence of water or the excessive flowing of water through the pipe may trigger a message to be transmitted to the home automation host system. Appliance controller 645 may be able to provide status messages about one or more appliances and/or control the functionality of one or more appliances. Garage door controller 642 may provide a status on the position of a garage door (open or closed) and/or may be able to control opening and closing of the garage door. Irrigation controller 646 may be able to provide a status of an irrigation system (on, off, current zone being watered) and may be able to control the irrigation system. Shade controller 616 may be able to provide a status as to the current position of a shade and may be able to control the position of the shade. Window sensor 610 may be able to provide a status as to the current position of a window (open or shut) and may be able to control the position of the window. Sound generation device 626 may refer to the sound generation devices detailed in relation to FIGS. 6-5 and can allow for sound to be output into the ambient environment of the sound generation device. Light controller 634 may be able to control whether a light is on or off and may be able to provide a status of the light. Pet door/feeder 602 may allow for home automation host 641 to control whether the pet door is locked or unlocked and dispense food. Smoke/CO detector 604 may be combined detector device or separate devices that can detect the presence of smoke and/or CO and provide such a status to home automation host 641. Home security system 606 may be enabled and disabled via home automation host 641 and may provide status information to home automation host 641 (e.g., movement detected, door ajar, glass break, etc.). Weather sensor 614 may provide weather data to home automation host 641. Utility monitor 618 may provide information on the use of utilities (e.g., power, gas, oil, water) to home automation host 641.

Door sensor 612 and lock controller 644 may be incorporated into a single device, such as a door lock and sensor unit, and may allow for a door's position (e.g., open or closed) to be determined and for a lock's state to be determined and changed. Door sensor 612 may transmit data to television receiver 670 or overlay device 640 that indicates the status of a door. Such status may indicate open or closed. When a status change occurs, the user may be notified as such via mobile device 620 or display device 630. Further, a user may be able to view a status screen to view the status of one or more door sensors throughout the location. Window sensor 610 and/or door sensor 612 may have integrated glass break sensors to determine if glass has been broken. Lock controller 644 may permit a door to be locked and unlocked and/or monitored by a user via television receiver 670 or overlay device 640. No mechanical or electrical component may need to be integrated separately into a door or door frame to provide such functionality. Such a single device may have a single power source that allows for sensing of the lock position, for sensing of the door position, and for engagement and disengagement of the lock.

Additional forms of sensors not illustrated in FIG. 6 may also be incorporated as part of a home automation system. For instance, a mailbox sensor may be attached to a mailbox to determine when mail is present and/or has been picked up. The ability to control one or more showers, baths, and/or faucets from television receiver 670 and/or mobile device 620 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 670 or overlay device 640 when within range. For instance, when a vehicle has been parked within range of a local wireless network with which the home automation host is connected, video and/or audio may be transmitted from the dashcam to the television receiver for storage and/or uploading to a remote server.

UAV 699 can be capable of streaming video and/or audio gathered outside of a home to display device 630 via overlay device 640 (or television receiver 670) and/or streaming such video and/or audio to a remote server via network 661. Via a service provider's server system, the video and/or audio may be streamed to mobile device 620 or any other remote computerized device through which an authorized user is logged in. In some embodiments, video and/or audio from UAV 699 may be retrieved directly by mobile device 620 from overlay device 640.

Figure 7:
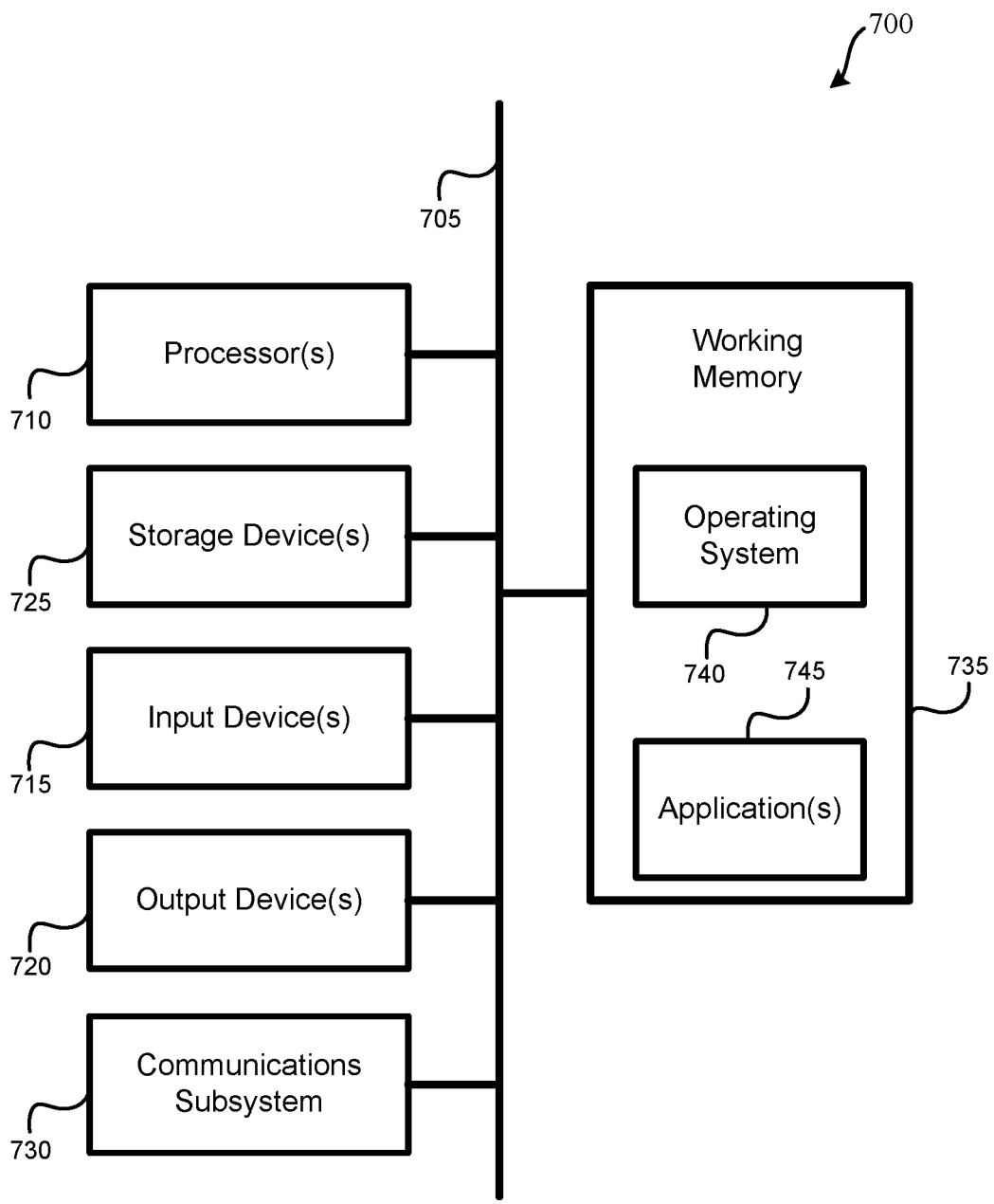
FIG. 7 illustrates an embodiment of a computer system that can be incorporated as part of the home automation devices of FIGS. 1-3 and 6.

FIG. 7 illustrates an embodiment of a computer system 700 that can be incorporated as part of the home automation devices of FIGS. 1-6. Computer system 700 may be incorporated as part of the various detailed home automation host systems, mobile devices, home automation server systems, home automation devices, and the sound generation device. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a touchscreen, keyboard, remote control, and/or the like; and one or more output devices 720, which can include without limitation a display device, a printer, etc.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for sound generation based on remotely-enforced rules, the method comprising:
   receiving, by a home automation host system, a rule definition for a rule, the rule defining a sound event to be remotely output in response to an occurrence of a home automation event, wherein the sound event indicates a sound;
   monitoring, by the home automation host system, home automation data received from one or more home automation devices for the home automation event;
   in response to receiving home automation data indicative of the home automation event, executing, by the home automation host system, the rule based on the rule definition;
   transmitting, by a low power wireless network interface of the home automation host system, to a sound generation device, a sound execution message comprising an identifier indicative of the sound, wherein:
   the sound corresponds to a local audio file stored by the sound generation device; and
   the sound generation device stores a data storage arrangement that links the local audio file with the identifier; and
   transmitting, by the home automation host system, to the sound generation device, via a low power wireless network, a local disablement indicator as a parameter of the sound execution message, wherein the local disablement indicator defines whether physical user input provided to the sound generation device is permitted to disable output of the local audio file.

2. The method for sound generation based on remotely-enforced rules of claim 1, the method further comprising:
   receiving, by the sound generation device, via the low-power wireless network, the sound execution message;
   accessing, by the sound generation device, the data storage arrangement to identify the local audio file based on the received identifier present in the sound execution message; and
   outputting, using an audio transducer of the sound generation device, the accessed local audio file.

3. The method for sound generation based on remotely-enforced rules of claim 1, the method further comprising:
   in response to receiving the rule definition, transmitting, by the home automation host system, an audio file of the sound to the sound generation device as part of a storage message, wherein when the recording of the sound is transmitted to the sound generation device the rule has not yet been executed; and
   storing, by the sound generation device, the audio file of the sound as the local audio file.

4. The method for sound generation based on the remotely-enforced rules of claim 3, the method further comprising:
   in response to receiving the recording of the sound, linking the identifier with the local audio file in the data storage arrangement.

5. The method for sound generation based on the remotely-enforced rules of claim 1, the method further comprising:
   receiving, at a mobile device, from a user, the rule definition of the rule and a sound recording; and
   transmitting, by the mobile device to the home automation host system via a home automation server system, the rule definition of the rule and the sound recording.

6. The method for sound generation based on the remotely-enforced rules of claim 1, the method further comprising:
   receiving, by the sound generation device, the local disablement indicator as part of the sound execution message;
   outputting, by the sound generation device, the sound; and
   in accordance with the local disablement indicator, disabling responsiveness to input received via one or more user input components of the sound generation device such that the one or more user input components cannot be actuated by a user to cease output of the local audio file.

7. The method for sound generation based on remotely-enforced rules of claim 1, wherein the low-power wireless network is a mesh network and transmitting the sound execution message to the sound generation device from the home automation host system comprises:
  relaying, via the low-power wireless network, the sound execution message to the sound generation device via a home automation device.

8. The method for sound generation based on remotely-enforced rules of claim 1, further comprising:
  determining, by the home automation host system, a mobile device is outside a threshold distance of a location linked with the home automation host system;
  in response to determining the mobile device is outside the threshold distance of the location, setting, by the home automation host system, the home automation host system to a user-away mode; and
  in response to the home automation host system being set to the user-away mode, enforcing a set of rules, comprising the rule, which is activated when the home automation host system is set to the user-away mode but not active when the home automation host system is set to a user-present mode.

9. The method for sound generation based on remotely-enforced rules of claim 1, the method further comprising:
  transmitting, by the home automation host system to the sound generation device, a repeat parameter for the sound event, wherein: the repeat parameter is defined by the rule and the repeat parameter defines a number of times or a length of time the local audio file is to be output by the sound generation device.

10. The method for sound generation based on remotely-enforced rules of claim 1, wherein the low-power wireless network interface transmits using a transmit power of 0 dBm or less.

11. A home automation system for sound generation based on remotely-enforced rules, the home automation system comprising:
  a home automation host system that comprises one or more processors and a memory communicatively coupled with and readable by the one or more processors and having stored therein processor-readable instructions which, when executed by the one or more processors, cause the one or more processors to:
  receive a rule definition for a rule, the rule defining a sound event to be remotely output in response to an occurrence of a home automation event, wherein the sound event indicates a sound;
  monitor home automation data received from one or more home automation devices for the home automation event;
  in response to receiving home automation data indicative of the home automation event, execute the rule based on the rule definition;
  transmit, to a sound generation device, via a low power wireless network interface, a sound execution message comprising an identifier indicative of the sound, wherein:
  the sound corresponds to a local audio file stored by the sound generation device; and
  the sound generation device stores a data storage arrangement that links the local audio file with the identifier; and
  transmit, to the sound generation device, via the low power wireless network interface, a local disablement indicator as a parameter of the sound execution message, wherein the local disablement indicator defines whether physical user input provided to the sound generation device is permitted to disable output of the local audio file.

12. The home automation system for sound generation based on remotely-enforced rules of claim 11, the home automation system further comprising the sound generation device, comprising an audio transducer and wireless transceiver, the sound generation device configured to:
  receive, via a low-power wireless network, the sound execution message;
  access the data storage arrangement to identify the local audio file based on the received identifier present in the sound execution message; and
  output, using the audio transducer, the accessed local audio file.

13. The home automation system for sound generation based on remotely-enforced rules of claim 11, wherein the processor-readable instructions, when executed, further cause the one or more processors to:
  in response to receiving the rule definition, transmit an audio file of the sound to the sound generation device as part of a storage message, wherein when the recording of the sound is transmitted to the sound generation device the rule has not yet been executed.

14. The home automation system for sound generation based on the remotely-enforced rules of claim 11, the home automation system further comprising:
  a home automation server system located remote from the home automation host system; and
  a mobile device, configured to:
    receive, from a user, the rule definition of the rule and a sound recording; and
    transmit, to the home automation host system via the home automation server system, the rule definition of the rule and the sound recording.

15. The home automation system for sound generation based on the remotely-enforced rules of claim 11, the home automation system further comprising the sound generation device that comprises an audio transducer and one or more user input components, the sound generation device configured to:
  receive the local disablement indicator as part of the sound execution message;
  output the sound; and
  in accordance with the local disablement indicator, disable responsiveness to input received via the one or more user input components of the sound generation device such that the one or more user input components cannot be actuated by a user to cease auditory output of the local audio file via the audio transducer.

16. The home automation system for sound generation based on remotely-enforced rules of claim 11, wherein the low-power wireless network is a mesh network and the processor-readable instructions that, when executed, cause the one or more processors to transmit the sound execution message to the sound generation device from the home automation host system comprises processor-readable instructions which, when executed, cause the one or more processors to:
  relay, via a low-power wireless network, the sound execution message to the sound generation device via a home automation device.

17. The home automation system for sound generation based on remotely-enforced rules of claim 11, wherein the processor-readable instructions, when executed, further cause the one or more processors to:
  transmit, to the sound generation device, a repeat parameter for the sound event, wherein: the repeat parameter is defined by the rule and the repeat parameter defines a number of times or a length of time the local audio file is to be output by the sound generation device.

18. A non-transitory processor-readable medium comprising processor-readable instructions that cause one or more processors to:

receive a rule definition for a rule, the rule defining a sound event to be remotely output in response to an occurrence of a home automation event, wherein the sound event indicates a sound;

monitor home automation data received from one or more home automation devices for the home automation event;

in response to receiving home automation data indicative of the home automation event, execute the rule based on the rule definition;

transmit, to a sound generation device, via a low power wireless network, a sound execution message comprising an identifier indicative of the sound, wherein:

the sound corresponds to a local audio file stored by the sound generation device; and the sound generation device stores a data storage arrangement that links the local audio file with the identifier; and transmit, to the sound generation device, via the low power wireless network, a local disablement indicator as a parameter of the sound execution message, wherein the local disablement indicator defines whether physical user input provided to the sound generation device is permitted to disable output of the local audio file.

* * * * *